(12) United States Patent
Pease et al.

(10) Patent No.: US 9,384,142 B2
(45) Date of Patent: Jul. 5, 2016

(54) EFFICIENT AND CONSISTENT PARA-VIRTUAL I/O SYSTEM

(71) Applicant: International Business Machines Corporation, Armonk, NY (US)

(72) Inventors: David A. Pease, Redwood Estates, CA (US); Mohit Saxena, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 14/487,910

(22) Filed: Sep. 16, 2014

(65) Prior Publication Data

US 2016/0077972 A1    Mar. 17, 2016

(51) Int. Cl.
G06F 12/00 (2006.01)
G06F 17/30 (2006.01)
G06F 13/00 (2006.01)
G06F 12/08 (2016.01)

(52) U.S. Cl.
CPC ........ G06F 12/0891 (2013.01); G06F 17/3007 (2013.01); G06F 17/30233 (2013.01); G06F 12/08 (2013.01); G06F 12/0868 (2013.01)

(58) Field of Classification Search
None
See application file for complete search history.

(56) References Cited

U.S. PATENT DOCUMENTS 5,893,149 A    4/1999 Hagersten et al.
8,635,410 B1   1/2014 Kuskin
2002/0188801 A1* 12/2002 Green ............... H04L 67/2885 711/113
2007/0294474 A1* 12/2007 Panabaker ......... G06F 12/0804 711/113
2011/0258391 A1* 10/2011 Atkisson ............ G06F 11/108 711/118
2013/0282994 A1* 10/2013 Wires ................. G06F 3/0604 711/158

OTHER PUBLICATIONS

Lee et al., A Paravisualized File System for Accelerating File I/O, Big Data and Smart Computing (BIGCOMP), 2014 International Conference, Jun. 2014, p. 309-313.
Koller et al., Write Policies for Host-Side Flash Caches, 11th USENIX Conference on File and Storage Technologies (FAST '13), 2013, p. 45-58.
Gordon et al., Towards Exitless and Efficient Paravirtual I/O, Proceedings of the 5th Annual International Systems and Storage Conference, ACM, 2012, p. 1-6.

* cited by examiner

Primary Examiner — Jared Rutz
Assistant Examiner — Marwan Ayash
(74) Attorney, Agent, or Firm — Lieberman & Brandsdorfer, LLC

(57) ABSTRACT

Embodiments of the invention relate to a para-virtual I/O system. A consistent para-virtual I.O system architecture is provided with a new virtual disk interface and a semantic journaling mechanism. The virtual disk interface is extended with two primitives for flushing and ordering I/O, both of the primitives being exported to para-virtual I/O drivers in a guest operating system. The ordering primitive guarantees ordering of preceeding writes, and the flushing primitive enforces order and durability. The guest drivers selectively uses both of these primitives based on semantics of the data being persisted from the para-virtual cache hierarchy to physical disk. The order of committed writes is enforced in order to enable a consistent start recovered after a crash.

18 Claims, 6 Drawing Sheets

EFFICIENT AND CONSISTENT PARA-VIRTUAL I/O SYSTEM

BACKGROUND

The present invention relates to crash consistency for para-virtual I/O caches through journaled filesystems. More specifically, the invention relates to a para-virtual I/O system architecture with a virtual disk interface and semantic journaling.

Virtualization has improved hardware utilization by allowing service providers to offer a wide range of application and infrastructure services. I/O virtualization is a methodology to simplify management, lower costs, and improve performance of servers in enterprise environments. I/O virtualization environments are created by abstracting upper layer protocols from physical connections or physical transport. This allows multiple physical servers and virtual machines to share I/O resources.

One virtualization technique is known as para-virtual I/O. In the para-virtual I/O system, a guest operating system is aware that it is running on a virtual disk. The para-virtual I/O system consists of a para-virtual driver in a guest operating system, and a virtual disk exported to the guest as a block device but stored as a file on the host filesystem. This enables flexible allocation of storage space and additional management features embedded in virtual machine images. The para-virtual I/O introduces a complex hierarchy of cache levels, which lends itself to concerns with providing crash consistency.

SUMMARY

The invention includes a method, computer program product, and system for providing crash consistency for para-virtual I/O caches through journaled filesystems.

A method, computer program product, and system are provided for a virtual disk interface and semantic journaling to support and enable the crash consistency. A virtual machine operating is provided in communication with a host machine. The virtual machine employs a guest operating system with guest page cache and guest disk cache. Similarly, the host machine employs a host operating system with host page cache. The caching layers of the virtual and host machines form a para-virtual storage system. In response to receipt of a flush request in the virtualized file system, the request is classified between a write order command and a write flush command. The write order provides asynchronous ordering for processing the flush request, and the write flush provides synchronous ordering for processing the flush request. The write order and write flush commands are selectively processed based on the classification of the received flush command. A converted request is determined by one of the classified selections and returns. The converted request is then process, with the processing including an enforcement of an order of committed writes. Accordingly, the enforcement of the order provides a consistent virtual disk image Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

The invention and its advantages and benefits are further explained in the detailed description of the invention herein below.

DETAIL DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
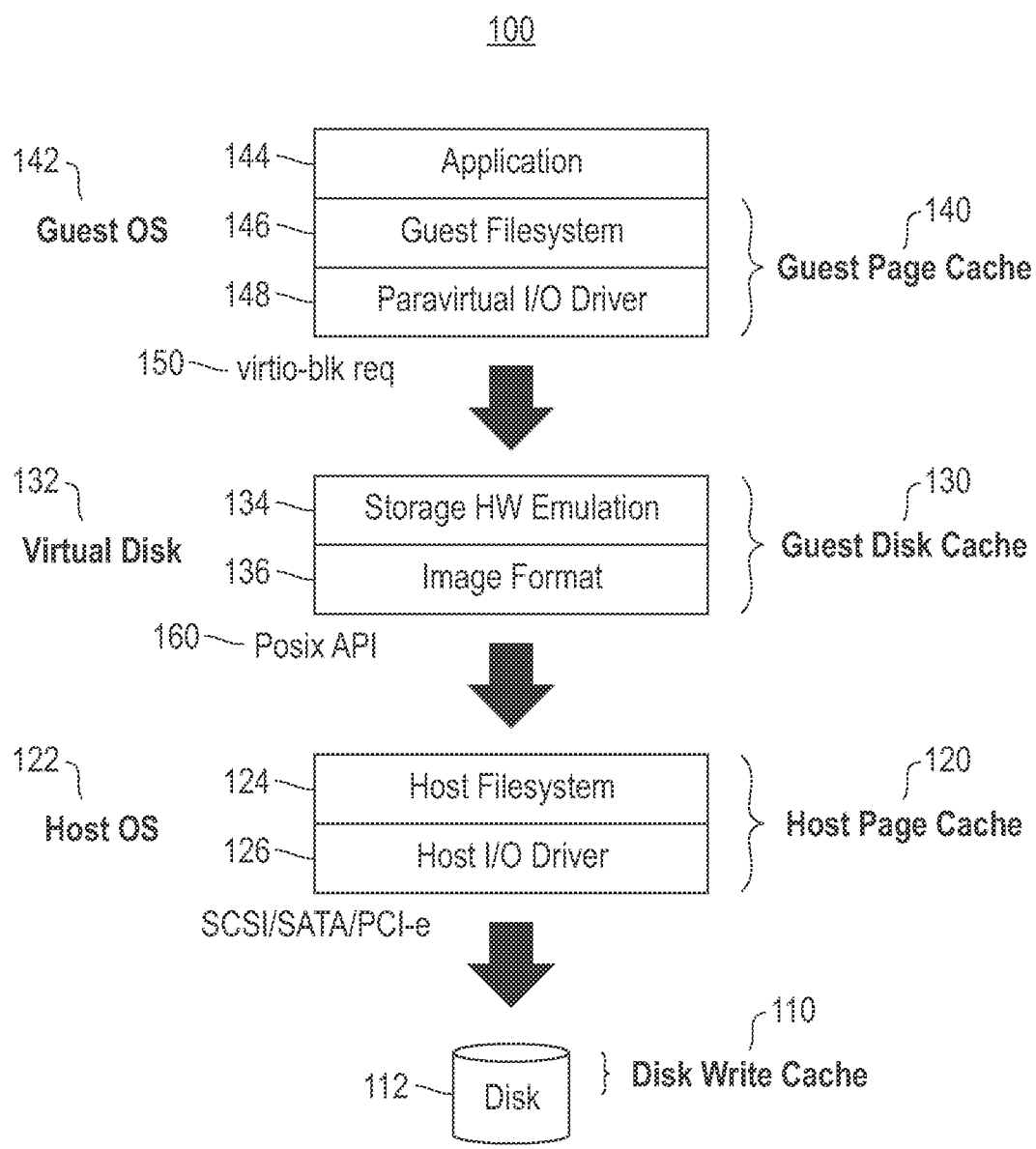
FIG. 1 depicts a block diagram illustrating a para-virtual I/O storage stack.

Para-virtual I/O system architecture introduces a complex hierarchy of cache levels and at the same time provides flexibility of the software interface to virtualized storage. Referring to FIG. 1, a block diagram (100) is provided illustrating a para-virtual I/O storage stack. The block diagram shows the different software and caching levels in the guest and host operating systems. There are four levels of cache, including disk write cache (110) associated with the physical disk (112), host page cache (120) associated with the host operating system (122), guest disk cache (130) associated with the virtual disk (132), and guest page cache (140) associated with the guest operating system (142). The host page cache (120) employs the host filesystem (124) and the host I/O driver (126). The guest disk cache (130) employs storage hardware emulation (134) and image format (136). The guest page cache (140) employs an application (144), a guest filesystem (146), and a para-virtual driver (148).

An application I/O request in the guest operating system (142) can be served from the guest page cache (140), or forwarded through a frontend guest para-virtual I/O device driver (148) to the backend virtual disk (132) running in the host user space. In one embodiment, the virtual disk (132) is a file on the host filesystem (124). As shown, there are two sets of interfaces (150) and (160) for a virtual disk. The first interface (150) is with the guest para-virtual driver (148), and the second interface (160) is with the host operating system (122). The guest driver (148) can send cache flush commands to the virtual disk (132), which further translates the flush commands into host filesystem calls. The host file system (124) sends cache flush commands to flush data from the physical disk write cache (110).

A guest I/O request can get cached within the host at three levels, including the virtual disk cache (130), host page cache (120), or physical disk cache (110). Each guest virtual machine can be configured from the host to use one of the combinations for host cache modes, including write back, write through, none, direct, and unsafe. The write back mode enables all three caches. The write through mode disables the guest disk cache. The none mode disables the host page cache, and has good performance for both random and sequential write modes. Disabling the host page cache in the none mode turns all write operations into direct I/O operations to disk write cache. The direct mode disables both the guest disk cache and the host page cache. The direct mode converts all writes into direct synchronous operations, each of which result in a disk cache flush. The unsafe mode enables all caches and ignores any cache-flush commands.

The guest and host filesystems can use journaling to provide write ordering and durability across the virtual and physical write caches. Filesytem journals send disk cache flush commands to ensure ordering and durability of writes. There are three major modes for journaling, including data, ordered, and write back. The data mode commits both data and metadata into the journal before being written into the main filesystem. The ordered mode writes data to the main filesystem before metadata is committed into the journal. The write back mode does not preserve ordering. Data may be written into the main filesystem after metadata has been committed into the journal. The write back mode is inclusive of all cache levels and fewer cache flush commands from the workload result in a larger effective cache size.

Nested filesystem journaling has significant performance impact on disk storage. A consistent para-virtual I/O system architecture interview, referred to herein as vDrive, provides a consistent virtual disk image across a system crash or power failure, cache management to improve performance for the para-virtual hierarchy, and filesystem journaling to reduce cost of cache-flushes for nested filesystems. vDrive provides two synchronization primitives and at least one notification protocol. The two primitives include a write flush primitive, referred to herein as vFlush, and a write order primitive, referred to herein as vOrder, to decouple ordering and durability guarantees of guest flushes to the virtual disk. The write flush functions as a synchronous flush request to flush I/O operations from the virtual disk write cache, and only returns when buffered writes have been acknowledged to be flushed from all three host cache levels, including the guest disk write cache, host page cache, and the physical disk write cache. The write order functions as an asynchronous flush request to order I/O operations for all writes buffered within the three host cache levels. When the operation returns, this request has been only submitted to the I/O queue in the host operating system. All preceding writes complete in order as they are submitted by the guest driver to the host emulation framework. New write issued after the write order primitive will always be durable after the writes preceding the write order primitive. All cache flush requests from the guest filesystem are converted to write order requests from the guest para-virtual driver. Finally, the notification protocol is provided to notify that all I/O operations queued before the write order has been synchronized to physical disk.

Figure 2:
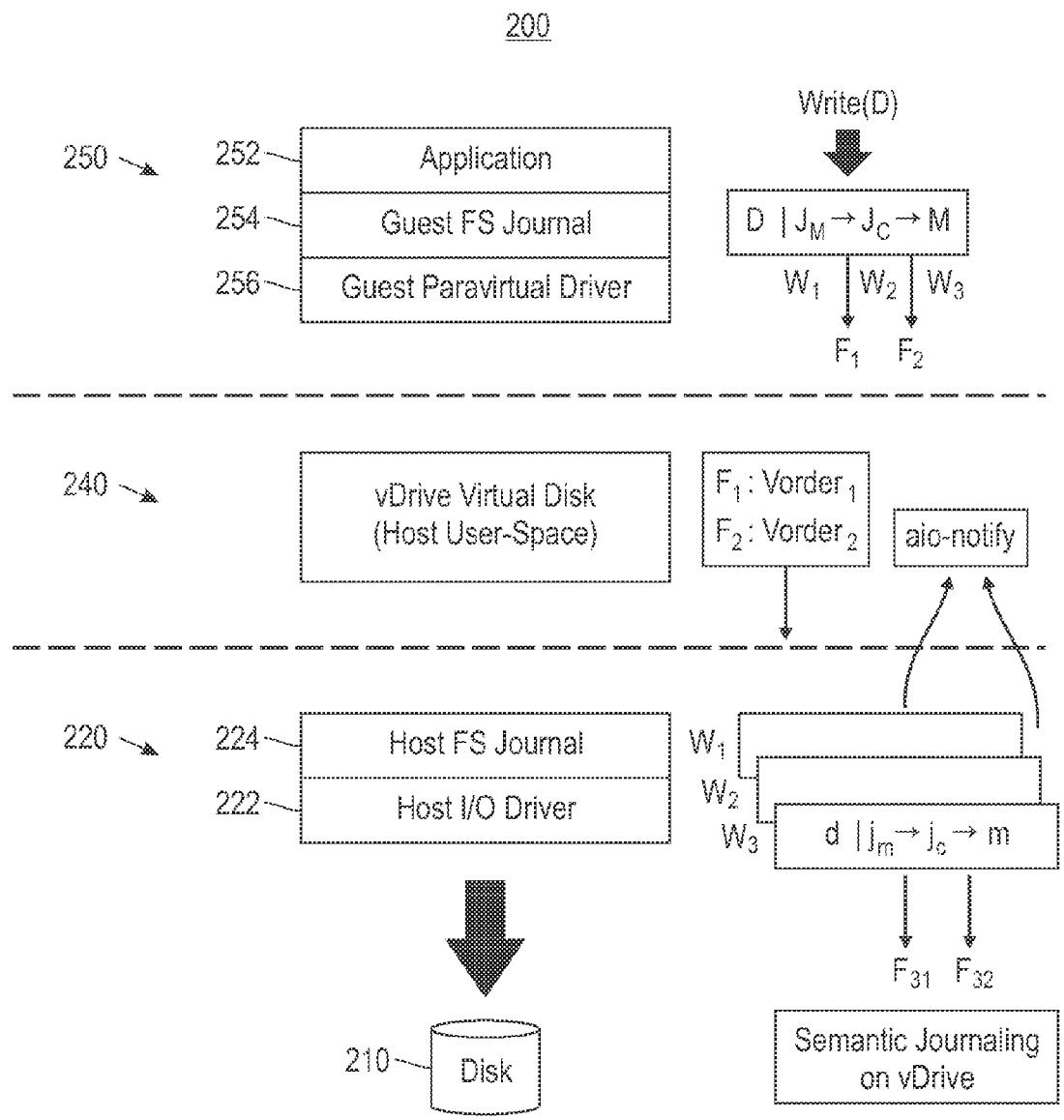
FIG. 2 depicts a block diagram illustrating semantic journaling on a virtual disk cache-flush interface.

Referring to FIG. 2, a block diagram (200) is provided illustrating semantic journaling on a virtual disk cache-flush interface. Journaling file systems avoid file system corruption by maintaining a journal. The journal is a special file that logs the changes destined for the file system in a circular buffer. At periodic intervals, the journal is committed to the file system. If a crash occurs, the journal can be used as a checkpoint to recover unsaved information and avoid corrupting file system metadata. Accordingly, journaling file systems are fault-resilient file systems that use a journal to log changes before they're committed to the file system to avoid metadata corruption.

As shown herein, the host machine (220) is provided in communication with persistent storage (210). The host machine includes a host I/O driver (222) to interface between a host filesystem journal (224) and the persistent storage (210). Although only one host machine (220) is shown herein, in one embodiment, there may be additional host machines. Each host machine is shown in communication with at least one virtual machine (250). In one embodiment, each host machine is provided with two or more virtual machines (250). For illustrative purposes, the configuration shown herein is one virtual machine (250) in communication with the host machine (220).

The virtual machine (250) is provided with an application (252), a guest filesystem journal (254) and a guest para-virtual driver (256). The guest filesystem journal (254) is a mechanism in the filesystem to ensure that data in the cache reaches persistent storage. The guest para-virtual driver (256) interfaces with the vDrive. As shown herein, the vDrive is in the host user space (240) and controls when blocks are flushed from the virtual machine (250) to the persistent storage (210).

Figure 3:
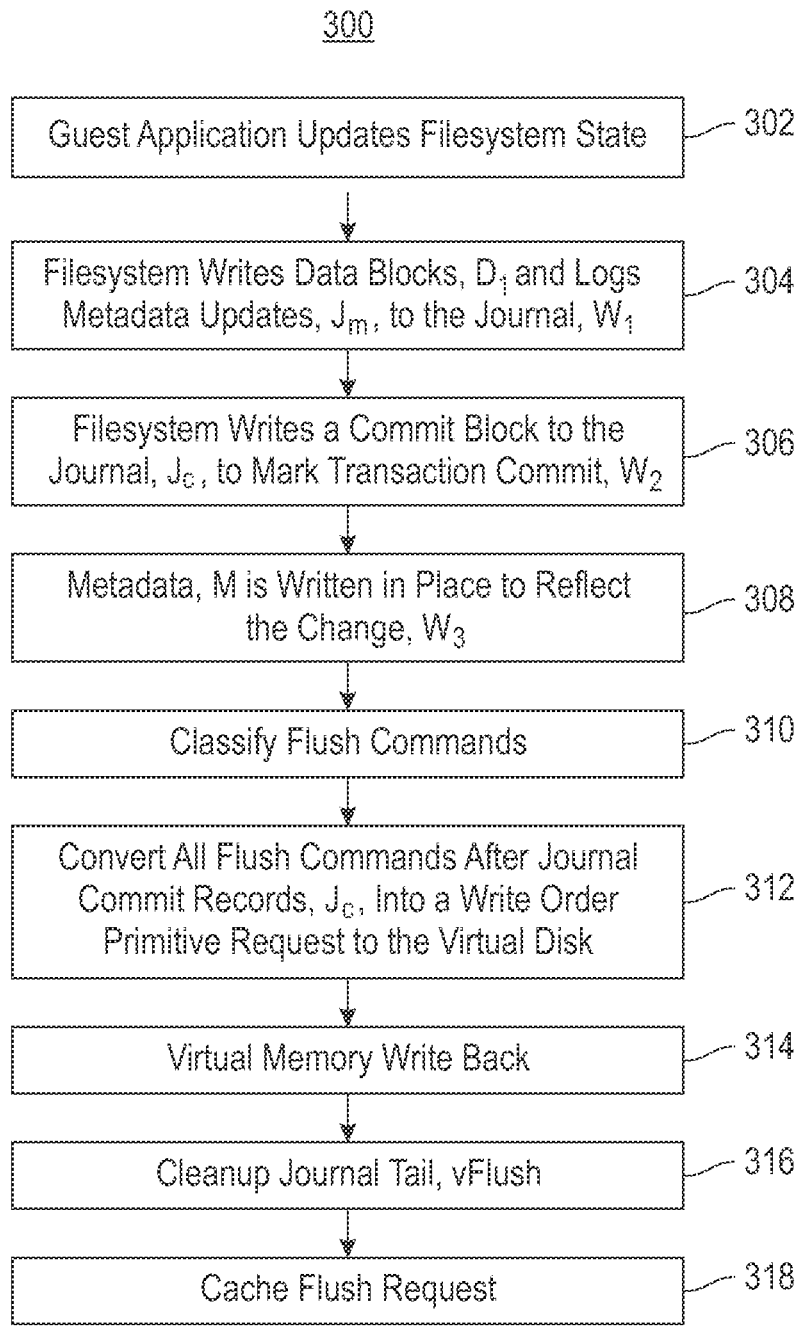
FIG. 3 depicts a flow chart illustrating a process of an application write to a data block through the guest filesystem to the host filesystem.

Referring to FIG. 3, a flow chart (300) is provided illustrating a process of an application write to a data block through the guest filesystem to the host filesystem employing vDrive semantic journaling. As shown, a guest application updates the filesystem state (302). Either filesystem metadata, user data, or both need to be updated in an ordered manner, referred to herein as a logical filesystem write operation. The logical write can be composed of multiple physical disk writes to dis-contiguous blocks. In one embodiment, there is no ordering required within a logical write itself for an ordered journal mode. However, where ordering is required between the different writes, the guest filesystem issues cache flush commands.

An atomic update of the filesystem metadata, including the inode and allocation map, to the journal is referred to as a transaction. The filesystem must first write data blocks, D, and log the metadata updates, $J_M$, to the journal (304). In one embodiment, the write at step (304) is referred to as a filesystem write, $W_1$. Following step (304), the filesystem writes a commit block to the journal, $J_C$, to mark transaction commit (306), also referred to as filesystem write $W_2$. Finally, the metadata, M, is written in place to reflect the change (308), also referred to as filesystem write $W_3$. The journaling protocol is to write data blocks D and log the metadata updates, $J_M$, before writing a commit block to the journal, $J_C$, and before writing the metadata M. The data, D, and the journal metadata entries, $J_M$, can represent multiple disk blocks within a transaction. The commit record, $J_C$, is a single sector.

Accordingly, for each application write to data, D, there are three logical filesystem write operations as shown as steps (304), (306), and (308).

The guest filesystem running in the virtual machine issues cache flush commands wherever order is required between different writes. Each flush command is classified from the guest filesystem based on the semantics of the data being persisted (310). In one embodiment, the semantic information used for classifying the cache flush request is passed by annotating them within the guest filesystem and virtual memory subsystems. Similarly, in one embodiment, the classification can be implemented by discovering the semantic information within the para-virtual I/O system. In one embodiment, the cache flush request is classified from the guest filesystem based on semantic requirements for ordering and durability to provide a consistent virtual disk image after a crash. There are four classifications based on when the cache flush is issued, including journal transaction commit, virtual memory page write-backs, checkpoints for journal truncation, and flushing I/O queues after a disk write failure.

The journal commit classification enables the vDrive to convert all guest filesystem cache flush commands after the journal commit records, $J_C$, into a write order primitive request to the virtual disk (312), also referred to as vOrder. This ensures a correct write ordering both within and across different guest filesystem transactions without incurring cost of immediate durability for each journal commit. The vDrive tracks the time elapsed since the last write order primitive completion. In one embodiment, if the time interval exceeds the freshness threshold for vDrive and there are pending write operations, a write flush primitive is issued to the host filesystem to ensure that the virtual disk image recovered after a crash is always consistent and has all updates older than a freshness threshold before the crash. Accordingly, the virtual disk image recovered after a crash is always consistent and has all updates older than the freshness threshold before the crash.

In addition to the journal commits, the guest virtual memory subsystem also writes pages back when the dirty to clean page ratio exceeds a configured threshold. This is referred to as a virtual memory write back (314). These writebacks take place in the background and do not require immediate durability. In one embodiment, vDrive uses the write order primitive for the virtual memory page write-backs. Accordingly, vDrive only requires correct ordering from these write backs with other writes.

Journal truncation takes place when the guest journal gets full. A cleanup is required for the journal tail to re-use space in memory and disk pre-allocated for the journal (316), also referred to as vFlush. The journal metadata checkpoint, M, and all transactions corresponding to the re-used journal space are flushed to the virtual disk before the cleanup starts. In one embodiment, vDrive issues the write flush primitive for all such cache-flush requests to enforce immediate durability and to avoid any transactions or checkpoints lost due to cleanup. Accordingly, the journal truncation issues a synchronous flush request.

The final classification is a cache flush request issued when a new write fails because of a stopped guest I/O scheduler queue (318). The guest I/O queue is stopped when the device driver signals it cannot service further request because of a full para-virtual hardware disk queue. The vDrive issues the write flush primitive to flush all queued requests with immediate durability guarantee and only then allows the queuing of the new write request. Accordingly, the write failure classification is a high priority classification as shown with issuance of a synchronous flush request.

As shown and described herein, vDrive functions on the user space of the physical machine and employs the ordering primitive to provide ordering and the flush primitive to provide both order and stability. With respect to journaling protocol, vDrive classifies cache flush requests selected between the ordering primitive, vOrder, and the flush primitive, vFlush. In addition, a new interface, referred to herein as aio-notify, is implemented within the vDrive cache manager as a signal handler. The new interface receives a notification when all write buffered within the host caches prior to a vOrder operation have been flushed to disk. The vDrive cache manager also update additional information, such as the number of pending write operations, and resets a time within the new interface. Accordingly, the vDrive intelligently classifies flush requests in a virtualized filesystem, also referred to herein as a nested filesystem, with the new interface providing an asynchronous notification on durability of the vOrder to physical disk.

As shown in FIG. 3, the vDrive journaling employs a plurality of invariants for guest filesystem writes that support recovery of the guest and host filesystem to a consistent state in the event of a system failure. Namely, data block, D, and journal metadata entry, $J_M$, within a transaction always reach disk before the journal commit record, $J_C$, two different transactions are always committed in order, and a transaction is never released for journal re-use before all previous check pointed blocks, M, are flushed to disk.

Figure 4:
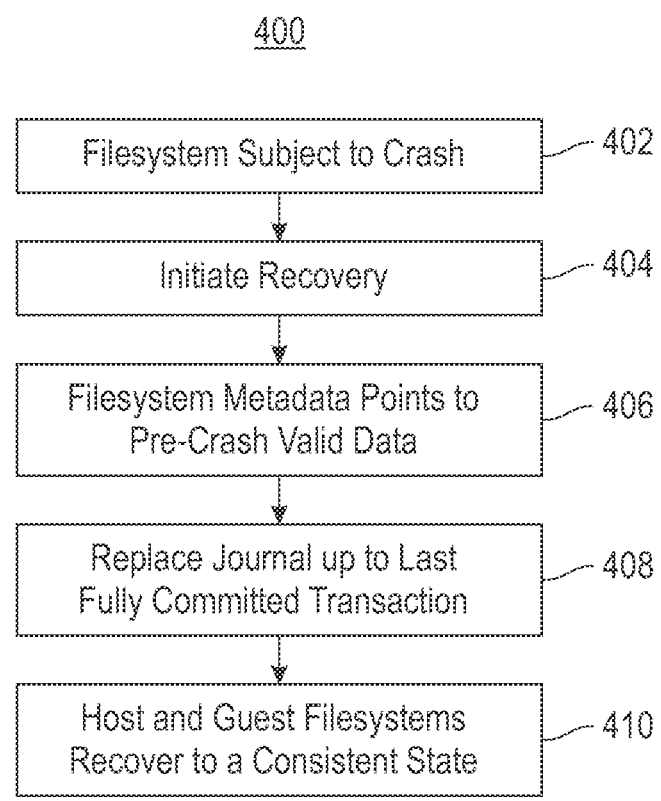
FIG. 4 depicts a flow chart illustrating crash recovery and behavior.

The filesystem always recovers to a consistent state that exists before the crash. Referring to FIG. 4, a flow chart (400) is provided illustrating crash recovery and behavior. As shown, when the filesystem is subject to a crash (402) recovery is initiated (404). Metadata of the filesystem points to valid data that existed before the crash (406). The journal is replayed up to the last fully committed transaction (408). The guest and host filesystems are both recovered to a consistent state (410). In one embodiment, journal replay brings the guest filesystem to a consistent state. Similarly, in one embodiment, the vDrive bounds the consistent state to be no older than the freshness threshold of the virtual disk. Accordingly, crash consistency is provided through the journaled filesystems.

Figure 5:
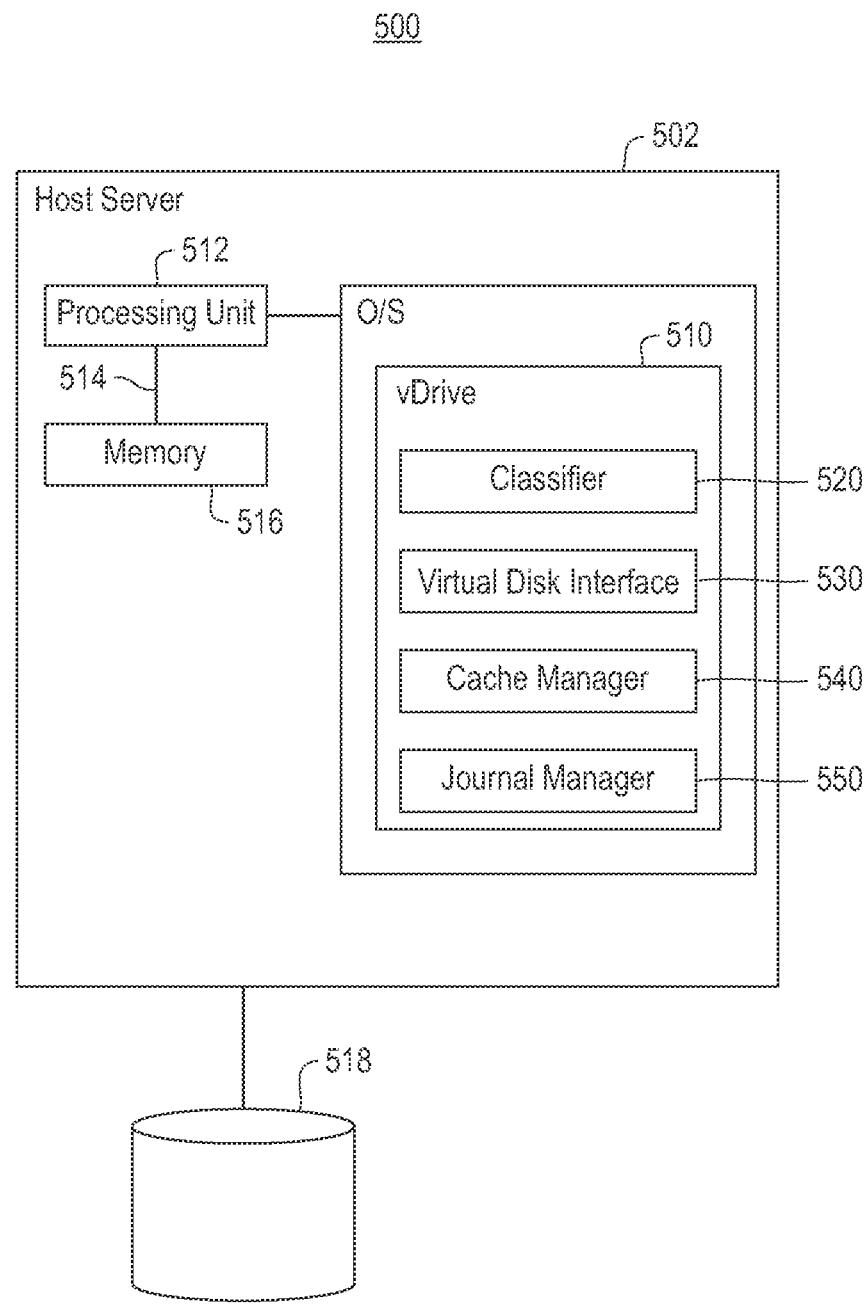
FIG. 5 depicts a block diagram illustrating vDrive, and specifically, the components thereof.

Referring to FIG. 5, a block diagram (500) is provided illustrating vDrive, and specifically, the components thereof. As shown, vDrive (510) is comprised of three components, including a semantic classifier (520), a virtual disk interface (530), and a cache manager (540). The semantic classifier (520) functions to classify the different cache flush requests sent to the block layer. In one embodiment, the classifier (520) augments cache-flush requests with an additional field, and in one embodiment, as a sub-type of an existing cache flush command. Specifically, a write to a commit record in a journal transaction commit added a vOrder sub-type. Similarly, the write from a virtual memory writeback thread adds the vOrder sub-type to the associate flush command. However, the write(s) during the journal clean-up for checkpointing add the vFlush sub-type to ensure that journal space is not re-used for a transaction before it is committed and its data is checkpointed. Similarly, an I/O queue restart code path uses the vFlsuh sub-type to flush all the preceeding requests in the queue on a write failure. In one embodiment, the block layers pass the sub-type field to the subsequent layer(s). The interface (530) is implemented in a modified guest driver. More specifically, the driver inserts a different vOrder and vFlush request into the buffer based on the sub-type of the command received from the associated block request queue in the guest operating system. The cache manager (540) issues a system call for a corresponding vOrder command received from the guest operating system. A freshness threshold time is initialized. The freshness timer is reset on each system call or vFlush completion. The cache manager (540) forces a vFlush operation if there is pending write operations and the freshness times exceed a freshness threshold of the vDrive. In one embodiment, the freshness threshold is configured to match an average latency of a single cache flush request.

The processes shown and described in FIGS. 1-4 may be embodied in a physical system (500) shown in FIG. 5 with tools to support a new virtual disk interface and a semantic journaling mechanism to provide a consistent para-virtual I/O system architecture. As shown, a host machine (502) is provided with a processing unit (512) in communication with memory (516) across a bus (514), and further in communication with storage (518). The host machine is configured with the para-virtual I/O stack shown and described in FIG. 1. As shown herein and described in detail in above, three components are provided to support and enable the virtual disk interface, including a classifier (520), and interface (530), and a cache manager (540). The classifier (520) functions to classify the different cache flush requests. In one embodiment, cache flush requests are augmented with an additional field, effectively adding a new command as a sub-type to an existing cache flush command. In one embodiment, the write to the commit record in the journal transaction commit adds the vOrder sub-type, the write from the virtual memory writeback thread also adds the vOrder subtype to the associated flush command. The writes during the journal cleanup for checkpointing add the vFlush sub-type to ensure that journal space is not re-used for a transaction before it is committed and its metadata is checkpoint. The I/O queue restart codepath uses the vFlush sub-type to flush all the preceeding requests in the queue on a write failure. In one embodiment, block layers blindly pass the sub-type field to the next layer. Accordingly, the classifier (520) is configured to receive a flush request and to classify the received flush request for selection between a write order command and a write flush command.

The interface (530) is provided in communication with the classifier (520). The interface (640) functions to facilitate communication between the classifier (520) and the cache manager (540). In one embodiment, the interface (640) employs a queue of threads to service requests as identified in an associated driver. The cache manager (540) is provided to selectively employ the write order and write flush commands based on the classification of the received flush command, and return a converted request form the classification, the conversion determined by one of the classified selections. Accordingly, a consistent virtual disk image is provided through enforcement of the order as supposed by classification of the flush request through the classifier (520), the interface (530), and selective employment of the write order and write flush commands by the cache manager (540).

As further shown, a journal manager (550) is provided in communication with the cache manager (540). The journal manager (550) functions to write data blocks and log any metadata updates between writing a commit block to a journal. More specifically, the journal manager (660) employs an asynchronous notification on durability of the write order to physical disk.

The system shown and described above in FIG. 5 has been labeled with tools in the form of the classifier (520), interface (530), cache manager (540), and journal manager (550). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 6:
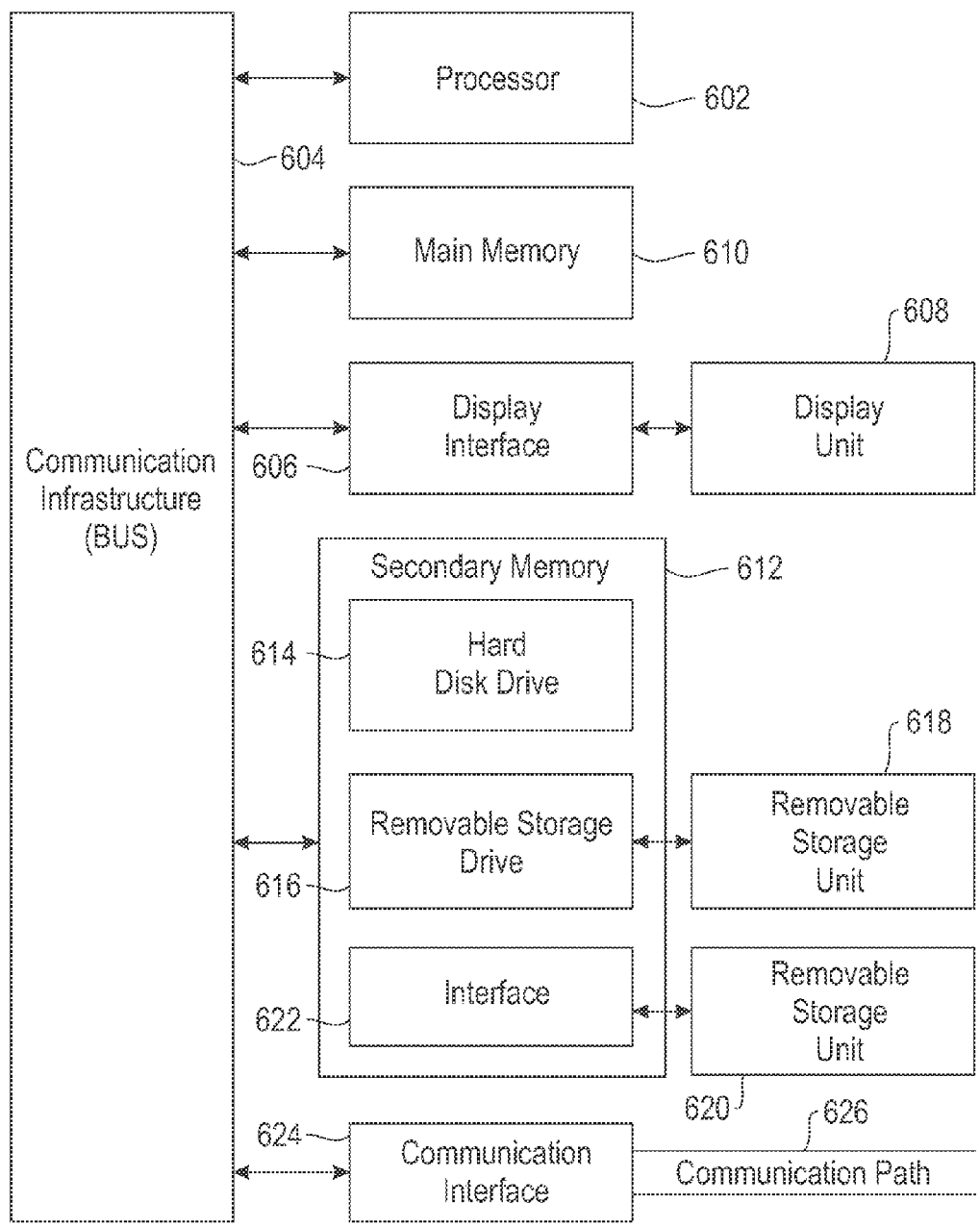
FIG. 6 depicts a block diagram illustrating additional details with respect to implementing an embodiment of the present invention.

Referring now to the block diagram of FIG. 6, additional details are now described with respect to implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to removable storage drive (616).

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) is in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The present invention may be a system, method, and/or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart(s) or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations, can be implemented by special purpose hardware-based systems that perform the specified functions/or acts or carry out combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of virtual disk interface shown and described herein together with the semantic journaling technique(s) provides crash recovery consistency for para-virtual I/O caches through the complex hierarchy of cache levels.

Alternative Embodiment

It will be appreciated that, although specific embodiments of the invention have been described herein for purposes of illustration, various modifications may be made without departing from the spirit and scope of the invention. In particular, the invention can be implemented in a hardware-assisted or a fully virtualized system similar to the para-virtualized embodiment implementation presented in this application by using an equivalent classifier functionality, and write order and flush I/O commands. Accordingly, the scope of protection of this invention is limited only by the following claims and their equivalents.

We claim:

1. A method comprising:
   in a virtual machine operating in communication with a host machine, including the virtual machine employing a guest operating system with guest page cache and guest disk cache, and the host machine employing a host operating system with host page cache, the caching layers forming a para-virtual storage system;
   performing semantic journaling within a virtualized file system in support of a logical file system write operation, including writing one or more data blocks and logging metadata updates before writing a commit block to a journal;
   receiving a flush request in the virtualized file system;
   classifying the received flush request for selection between a write order command and a write flush command, wherein write order provides asynchronous ordering for processing the flush request, and write flush provides synchronous ordering for processing the flush request;
   selectively employing the write order and write flush commands based on the classification, and returning a converted request from the classification, the conversion determined by one of the classified selections;
   processing the converted request, including enforcing an order of committed writes; and
   returning a consistent virtual disk image provided through enforcement of the order.

2. The method of claim 1, further comprising classifying the received flush request with a journal transaction commit, including converting all guest cache flush commands after a journal commit record into a write primitive to order all writes buffered within the multiple cache layers.

3. The method of claim 1, further comprising classifying the received flush request with virtual memory page write back, including a guest virtual memory subsystem writing back one or more pages when a dirty to clean ratio exceeds a threshold.

4. The method of claim 1, further comprising classifying the received flush request with a journal truncation including flushing a journal metadata checkpoint and all transactions corresponding to re-used journal space to a virtual disk prior to cleanup.

5. The method of claim 1, further comprising classifying the received flush request with a write failure responsive to a write failure associated with a stopped guest queue, including flushing all enqueued requests.

6. The method of claim 1, further comprising a new interface providing an asynchronous notification on durability of the write order to physical disk.

7. A computer program product for a para-virtual I/O system architecture, the computer program product comprising a computer readable storage device having program code embodied therewith, the program code executable by a processing unit to:
   perform semantic journaling within a virtualized file system in support of a logical file system write operation, including program code to write one or more data blocks and log metadata updates before writing a commit block to a journal;
   receive a flush request in the virtualized file system;
   classify the received flush request for selection between a write order command and a write flush command, wherein write order provides asynchronous ordering for processing the flush request, and write flush provides synchronous ordering for processing the flush request;
   selectively employ the write order and write flush commands based on the classification, and return a converted request from the classification, the conversion determined by one of the classified selections;
process the converted request, including program code to enforce an order of committed writes; and
return a consistent virtual disk image provided through enforcement of the order.

8. The computer program product of claim 7, further comprising program code to classify the received flush request with a journal transaction commit, including program code to convert all guest cache flush commands after a journal commit record into a write primitive to order all writes buffered within the multiple cache layers.

9. The computer program product of claim 7, further comprising program code to classify the received flush request with virtual memory page write back, including program code to write back one or more pages when a dirty to clean ratio exceeds a threshold.

10. The computer program product of claim 7, further comprising program code to classify the received flush request with a journal truncation, including program code to flush a journal metadata checkpoint and all transactions corresponding to re-used journal space to a virtual disk prior to cleanup.

11. The computer program product of claim 7, further comprising program code to classify the received flush request with a write failure responsive to a write failure associated with a stopped guest queue, including program code to flush all enqueued requests.

12. The computer program product of claim 7, further comprising program code to provide, within a new interface, an asynchronous notification on durability of the write order to physical disk.

13. A system comprising:
a para-virtual I/O system architecture, including a virtual machine employing a guest operating system with guest page cache and guest disk cache, and a host machine employing a host operating system with host page cache, the caching layers forming a para-virtual storage system;
a journal manager to perform semantic journaling within a virtualized file system in support of a logical file system write operation, including the journal manager to write a commit block to a journal after the write operation, wherein the write operation comprises a write of data blocks and a log of metadata updates;
a classifier to classify a received flush request for selection between a write order command and a write flush command, wherein the write order provides an asynchronous order for processing the flush request, and write flush provides a synchronous order for processing the flush request; and
a cache manager in communication with the journal manager to:
selectively employ the write order and write flush commands based on the classification;
return a converted request from the classification, the conversion determined by one of the classified selections; and
process the converted request, including the cache manager to enforce an order of committed writes, wherein the enforcement of the order provides for a consistent virtual disk image.

14. The system of claim 13, further comprising the classifier to classify the received flush request with a journal transaction commit, including a conversion of all guest cache flush commands after a journal commit record into a write primitive to order all writes buffered within the multiple cache layers.

15. The system of claim 13, further comprising a guest virtual memory subsystem to write back one or more pages when a dirty to clean ratio exceeds a threshold, and the classifier to classify the received flush request with the virtual memory page write back.

16. The system of claim 13, further comprising the classifier to classify the received flush request with a journal truncation, and to flush a journal metadata checkpoint and all transactions corresponding to re-used journal space to a virtual disk prior to cleanup.

17. The system of claim 13, further comprising the classifier to classify the received flush request with a write failure responsive to a write failure associated with a stopped guest queue, including the classifier to flush all enqueued requests.

18. The system of claim 13, further comprising the journal manager to employ an asynchronous notification on durability of the write order to physical disk.

* * * * *